US 6,738,713 B2

(12) United States Patent
Pratt (10) Patent No.: US 6,738,713 B2
(45) Date of Patent: *May 18, 2004

(54) POSITIONING APPARATUS AND METHOD (75) Inventor: Anthony Richard Pratt, Brixworth (GB)

(73) Assignee: Parthus (UK) Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/172,801

(22) Filed: Jun. 13, 2002

(65) Prior Publication Data

US 2003/0009283 A1 Jan. 9, 2003

Related U.S. Application Data (63) Continuation of application No. PCT/GB01/05430, filed on Dec. 7, 2001, and a continuation-in-part of application No. 10/074,993, filed on Feb. 13, 2002, which is a continuation of application No. 09/584,659, filed on May 30, 2000, now abandoned, which is a continuation of application No. PCT/GB00/02055, filed on May 26, 2000.

(51) Int. Cl.$^7$ ................................................. G01S 5/14
(52) U.S. Cl. ...................... 701/213; 701/207; 342/357.9
(58) Field of Search ................................. 701/213, 207, 701/214, 215, 220, 225; 342/357.12, 357.9, 450, 551; 375/150

(56) References Cited

U.S. PATENT DOCUMENTS

| 4,468,793 A | 8/1984 | Johnson et al. ............. 375/344 |
| 4,695,843 A | 9/1987 | Lamiraux ..................... 342/417 |
| 4,812,991 A | 3/1989 | Hatch .......................... 701/225 |
| 5,519,620 A | 5/1996 | Talbot et al. ................ 701/214 |
| 5,729,235 A | 3/1998 | Guthrie et al. .......... 342/351.12 |
| 5,757,786 A | 5/1998 | Joo .............................. 370/324 |
| 5,781,156 A | 7/1998 | Krasner .................. 342/357.12 |
| 5,793,328 A | 8/1998 | Ward et al. ............. 342/357.09 |
| 5,884,214 A * | 3/1999 | Krasner ....................... 701/207 |
| 6,140,957 A | 10/2000 | Wilson et al. .......... 342/357.08 |
| 6,539,305 B2 * | 3/2003 | Pratt ........................... 701/213 |

FOREIGN PATENT DOCUMENTS

| EP | 0732596 A2 | 9/1996 |
| FR | 2759783 | 2/1997 |
| GB | 2265063 A | 9/1993 |
| GB | 2 339 641 A | 9/2000 |
| GB | 2 352 900 A | 2/2001 |
| WO | WO 93/22691 A1 | 11/1993 |
| WO | WO 95/14937 A1 | 6/1995 |
| WO | WO 97/14049 A3 | 4/1997 |
| WO | WO 97/14056 A1 | 4/1997 |
| WO | WO98/02974 | 1/1998 |
| WO | WO 98/02974 A1 | 1/1998 |
| WO | WO00/10030 | 2/2000 |
| WO | WO00/73812 A1 | 12/2000 |

* cited by examiner

*Primary Examiner*—Marthe Y. Marc-Coleman
(74) *Attorney, Agent, or Firm*—Kilpatrick Stockton LLP (57) ABSTRACT

Positioning apparatus for use in a moving vehicle includes circuitry arranged to process signals received from GPS satellites, and to provide signals in response thereto from which the position of the apparatus can be calculated at a remote station. The apparatus provides, for each satellite in view, carrier frequency estimation signals, samples of the carrier signals and code tracking signals to a data transmission device, which modulates the signals onto a carrier prior to transmission to the remote station. A carrier loop reconstruction device and a location processor in the remote station cooperate to determine the location of the positioning apparatus. A memory device at the remote station may record the signals received from the vehicle over a period of time, for subsequent carrier loop reconstruction and location determination.

37 Claims, 7 Drawing Sheets

POSITIONING APPARATUS AND METHOD

CROSS REFERENCE TO RELATED APPLICATIONS

This is a continuation of International Application No. PCT/GB01/05430 filed Dec. 7, 2001; and is a continuation-in-part of U.S. application Ser. No. 10/074,993 filed Feb. 13, 2002, which is a continuation of U.S. application Ser. No. 09/584,659 filed May 30, 2000 and now abandoned, which in turn is a continuation of International Application No. PCT/GB00/02055 filed May 26, 2000.

This invention relates to positioning apparatus, and in particular to positioning apparatus suitable for determining the position of a moving vehicle, and to a positioning method.

Tracking of the position of high dynamic moving vehicles whilst in flight is desirable for many reasons, particularly as it can allow the location of a vehicle to be accurately determined even though the location may not be visible from a viewing site.

For this purpose, it is known to use a translator device forming part of the vehicle, and a base or ground station remote from the vehicle. The translator device receives positioning signals from a number of satellites of, for example, the GPS constellation, and amplifies and frequency translates the signals before transmitting them as translator signals to the base station. A positioning receiver in the base station then processes the translator signals to determine position information relating to the translator device and thus the host vehicle. By recording the translator signals, the base station can plot the path of the vehicle accurately and with whatever time intervals are required, after the vehicle's flight. Translator systems are resistant to the effects of acceleration bursts. However, the bandwidth required for Inclusion of simplified GPS receivers in wireless telephones and other mobile devices with communication capability has been proposed. Such devices may include personal digital assistants (PDAs), laptop computers and in-car navigation systems. The GPS receivers comprise circuitry arranged to process positioning signals transmitted by the satellites, to determine interim position information. Extraction of the data carried on the positioning signals is carried out at a base or ground station, which can thereby calculate position information relating to the GPS receiver and thus the wireless telephone.

Such a system is beneficial in that it removes a substantial processing burden from the mobile device, yet allows rapid determination of its position. Furthermore, the accuracy of location determination of such a system can easily be increased through the use of differential GPS techniques.

According to a first aspect of this invention, there is provided positioning apparatus for use in a moving vehicle comprising: a receiver for receiving coded ranging signals from each of a plurality of remote transmitters including at least one positioning satellite; a code correlator device arranged to correlate a locally provided code with the code contained in modulation of the coded ranging signals, and to provide correlator output signals in response thereto; a code tracking device responsive to at least some of the correlator output signals to provide code tracking output signals; a carrier frequency estimator device, arranged to receive at least some of the correlator output signals, to estimate the carrier frequency of the coded ranging signals, and to provide carrier frequency estimation signals in response thereto, the carrier frequency estimator device being arranged to operate in two modes, the sampling rate of the correlated output signals being higher in an initial mode than in a subsequent mode; a carrier sampling device arranged to receive and to sample at least some of the correlator output signals to provide carrier sample signals from which information about the phase of a carrier of the coded ranging signals can be determined; and a transmitter arranged to receive the code tracking output signals, the carrier sample signals and the carrier frequency estimation signals, and to transmit signals which are representative of the code tracking output signals, the carrier sample signals and the carrier frequency estimation signals, to allow position information relating to the apparatus to be determined by further processing at a location remote from the vehicle.

In this way, it is possible to construct positioning apparatus which is capable of providing precision position tracking and which may better maintain satellite carrier tracking lock, especially where high values of acceleration and jerk may be experienced. In addition, the bandwidth required for transmitting the relevant signals to a ground or other remotely located base station may be considerably less than that required for the translator system mentioned above.

Preferably, the carrier frequency estimator device is an open loop device, Alternatively, it may comprise a frequency locked loop, which may allow reduced data rates and therefore a reduced bandwidth channel required for transmission between the positioning apparatus and a ground station.

The remote transmitters typically consist of positioning satellites, such as those forming the global positioning system (GPS) constellation. However, the remote transmitters could be ground-based pseudo-lites, or a mix of pseudo-lites and satellites. A pseudo-lite is a device which transmits positioning/timing signals at the same frequency as positioning satellites although, in the case of GPS pseudo-lites, the modulating code is not the same as the code transmitted by any of the satellites but it is of the same class. Pseudo-lites may transmit positioning/timing signals at any frequency. Those signals are synchronised with GPS. For GPS signals, the modulating code is an N=10 Gold code. The term for positioning satellites used in this specification is space vehicles (SVs).

In accordance with a second aspect of the invention, there is provided a method of determining position information relating to a vehicle, the method comprising: in a receiver associated with the vehicle: receiving coded ranging signals from each of a plurality of remote transmitters including at least one positioning satellite; correlating a locally provided code with the code contained in modulation of the coded ranging signals, and providing correlated output signals in response thereto; tracking at least some of the correlated output signals, and providing code tracking output signals in response thereto; initially estimating the frequency of the carrier of the coded ranging signals from samples of the correlated output signals, subsequently controlling an oscillator of the receiver to adopt a frequency substantially corresponding to the estimated frequency, subsequently estimating the frequency of the carrier of the coded ranging signals from samples of the correlated output signals having a lower sampling rate that the samples used in the initial estimation step and providing carrier frequency estimation signals in response thereto; sampling at least some of the correlated output signals to provide carrier sample signals from which information about the phase of the carrier of the coded ranging signals can be determined; and transmitting signals representative of the code tracking output signals, the carrier sample signals and the carrier frequency estimation signals; and in a remote station, processing the transmitted signals to determine position information relating to the vehicle.

In accordance with a third aspect of the invention, there is provided apparatus for calculating the position of a remote vehicle mounted receiver capable of receiving coded ranging signals from each of a plurality of remote transmitters, the apparatus comprising: a wireless data receiver; a carrier loop reconstructor device arranged to receive carrier frequency estimation signals and carrier sample signals received at the wireless data receiver, to detect the phase and the frequency of carrier signals received at the remote receiver on the basis thereof, to reconstruct the carrier of the ranging signals as experienced by the vehicle-mounted receiver, and to provide carrier output signals in response thereto; a pseudo-range measurement device arranged to receive code tracking signals received at the wireless data receiver, to determine positioning information relating to the remote receiver on the basis thereof, and to provide positioning signals in response thereto; and a location calculator arranged to calculate a location of the remote receiver on the basis of the carrier output signals and the positioning signals.

In accordance with a fourth aspect of the invention, there is provided a complex Costas loop arrangement, comprising: a complex frequency changer, having a real and imaginary digital signal inputs and real and imaginary oscillator digital inputs, the complex frequency changer being arranged to provide signals at real and imaginary digital outputs having a frequency dependent on the frequencies of signals received at the inputs; and an oscillator having an input connected, preferably via a device having a transfer function, to the outputs of the frequency changer device; the oscillator being arranged to provide oscillator signals to the oscillator inputs of the complex frequency changer dependent on signals received at its input.

Embodiments of the invention will now be described, by way of example only, with reference to the accompanying drawings, of which.

Figure 1:
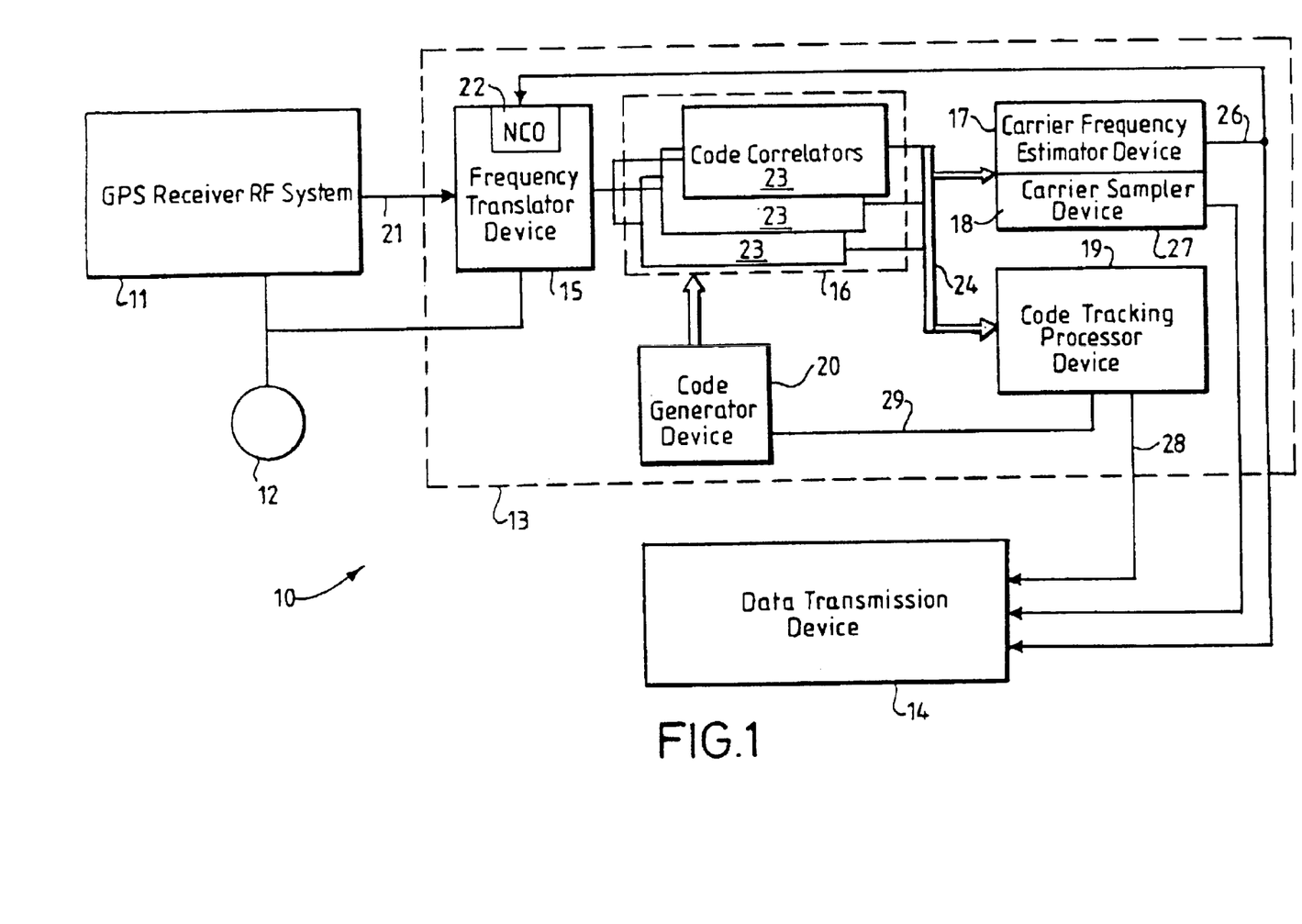
FIG. 1 is a schematic drawing of positioning apparatus, in accordance with the invention, intended for mounting on a host vehicle.

Referring to FIG. 1, positioning apparatus 10 comprises generally a Global Positioning System (GPS) Radio Frequency (RF) receiver 11, a 20 MHz reference frequency oscillator 12, a GPS signal processor 13 a data transmission device 14 and a local clock 9. The apparatus 10 is mountable on a host vehicle (not shown), the apparatus typically being mounted externally of the vehicle, or behind or within a structure of RF transparent material forming part of the body of the host vehicle.

The GPS signal processor 13 comprises generally a frequency translator device 15, a code correlator device 16, a carrier frequency estimator device 17, a carrier sampling device 18, a code tracking processor device 19 and a code generator device 20. Although only one is shown in FIG. 1, a plurality of GPS signal processors 13 are provided in the positioning apparatus 10, to allow signals from plural SVs to be tracked and to allow improved SV acquisition time. The operation of each of the frequency translator device 15, the code correlator device 16, the code tracking processor device 19 and the code generator device 20 is conventional.

Figure 1A:
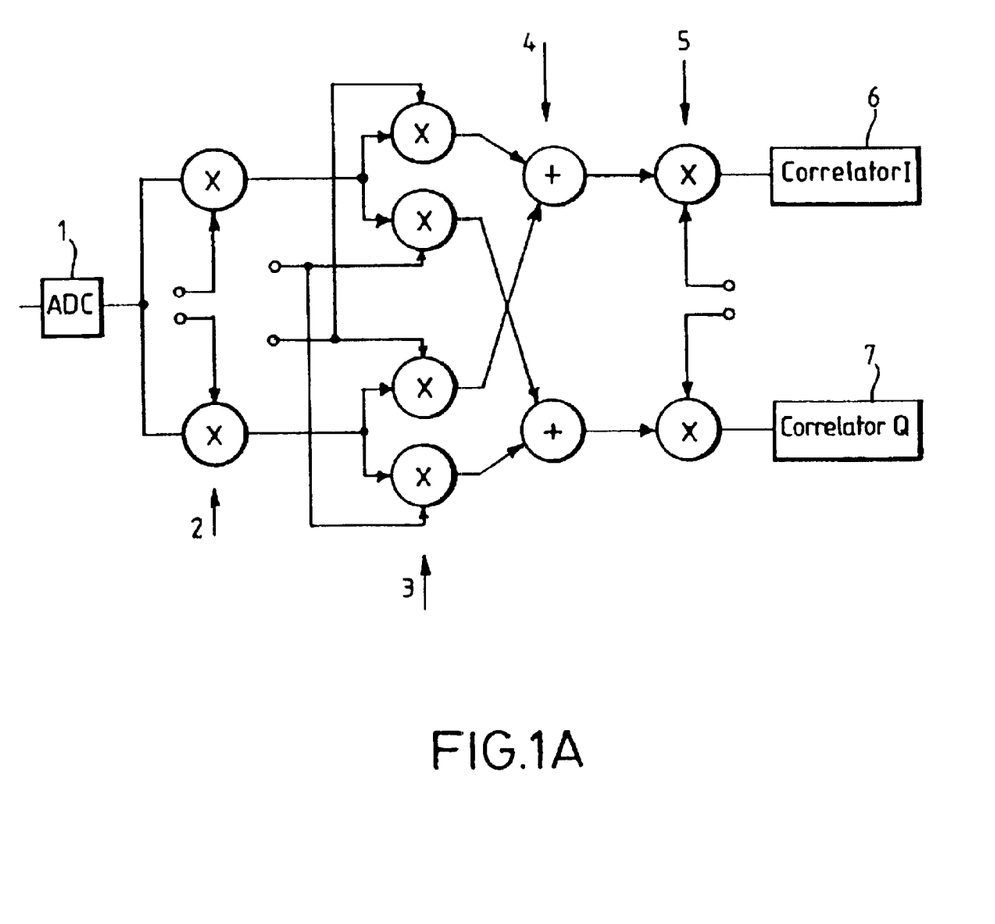
FIG. 1A is a more detailed schematic drawing showing part of the apparatus of FIG. 1.

The frequency translator device 15 is shown in more detail in FIG. 1A. In FIG. 1A. the frequency translator device comprises an analogue-to-digital converter (ADC) 1, first and second mixer stages 2 and 3, a sum and difference network 4, a code mixer stage 5, and I and Q correlators 6 and 7. The ADC 1 receives satellite signals at an intermediate frequency of 15.42 MHz from the receiver 11, and provides samples thereof to each of two mixers forming the first mixer stage 2. These mixers are provided with, respectively, in-phase and quadrature versions of a three-level digital sinusoid-approximating signal having a frequency of approximately 5 MHz. The outputs of these mixers are double sideband in-phase and quadrature components of the frequency translated satellite signal. Outputs of the first mixer stage are each connected to two of four mixers forming the second mixer stage 3. These mixers are provided with 420 kHz signals from a numerically controlled oscillator (NCO) 22 (shown in FIG. 1)—two mixers receiving in-phase versions and two mixers receiving quadrature versions. The outputs of the mixers of the second mixer stage are cross-coupled to inputs of the sum and difference network 4, whose outputs contain the satellite signal frequency translated to substantially zero in in-phase and quadrature form. This is a single sideband frequency translation.

These baseband positioning signals are provided to two correlators of four or six correlators 23 present in the code correlator device 16. An in-phase and a quadrature correlator of the correlator device 16 are provided with a prompt version of a replica of the code which is modulated onto the positioning signals, and the other two or four correlators are provided with a one-chip early-minus-late version of the replica code. Of course, other schemes of early, prompt and late codes may be used, as will be apparent to those skilled in the art. Such schemes may include a prompt code replica, an early code replica, and a late code replica, or a sub-chip early-minus-late code replica and a prompt code replica.

Mixing the zero frequency satellite signals with the code removes the code when there is code alignment. In a GPS receiver, the code is a CA code, which is a member of the Gold Code family. Other codes may also be suitable.

The correlators 23 include up/down counters (not shown) which are clocked at the frequency of the reference oscillator 12. The counts of these up/down counters are incremented every clock pulse for which its respective input signal is positive, and decremented every clock pulse for which its input signal is negative. The count is not changed at clock pulses occurring when the input signal is zero. The up/down counters of the code correlator device 16 provide their counts on an output 24 as correlator output signals, which constitute the average of the codeless signals over a period of time. The correlator output signals are received at and are used by the code tracking processor device 19 to provide code tracked feedback signals via an output 29 to the code generator device 20. These feedback signals allow the code replica signals to converge with and ideally become synchronised with the received code, and to maintain convergence or synchronisation therewith. The outputs of the in-phase and quadrature correlators of the prompt channel are representative of the residual phase, frequency and amplitude of the carrier signal after downconversion.

The code tracking device 20 also provides code tracking signals to the data transmission device 14. These code tracking signals are derived from the in-phase and the quadrature correlators which are provided with the early-minus-late version of the replica code.

The correlator output signals provided by the prompt correlators, which include filtered I and filtered Q signals, are provided to the carrier frequency estimator device 17 and to the carrier sampling device 18. The carrier sampling device 18 samples the I and Q correlator output signals at 40 microsecond intervals. 40 microsecond intervals correspond to a sampling frequency of 25 kHz, which is approximately twice the maximum expected frequency uncertainty of 12 kHz. Carrier sample signals, from which the phase of the carrier signal can be obtained, are provided by the carrier sampling device 18 on an output 27. Since these signals are useful only when there is substantial alignment of the replica code with the received code, these signals are provided only when substantial code alignment is present. The carrier sample signals are received by the data transmission device 14, which is connected to the output 27.

The carrier frequency estimation process performed by the carrier frequency estimator device 17 is a two stage process. Initially, the frequency difference (error) between the NCO 22 frequency and the frequency of the downconverted received signal may be large, due to Doppler shift resulting from movement of the SV relative to the host vehicle and due to a lack of knowledge of the exact frequency of the reference oscillator 12. In order to accommodate the potentially large initial frequency error, a fast Fourier transform (FFT) algorithm is implemented in a processor forming part of the carrier frequency estimator device, which uses 8 kHz samples of the output of the prompt correlator 23. The FFT algorithm employs a data window function which may be a rectangular window function, a Hamming window function or a raised cosine data window function, in order to control and thus reduce the leakage which necessarily occurs between frequency samples having a finite measurement time. The frequency error is estimated from a determination of the I and Q rotation, accumulated over 8 ms. In conditions where the NCO 22 may be operating at a frequency more than 4 kHz from the downconverted carrier frequency, the possibility of aliasing is reduced by performing three FFT processes. Here, the FFT processes are windowed, relative to the frequency of the NCO 22, from −12 kHz to −4 kHz, from −4 kHz to 4 kHz, and from 4 kHz to 12 kHz. In this way, aliasing may only occur if the frequency of the NCO 22 differs from the downconverted carrier frequency by more than 12 kHz. As an alternative to FFTs, Winograd transforms or discrete Fourier transforms (DFTs) could be used.

Once the carrier replica signal generated by the NCO 22 is of a similar frequency to the downconverted carrier frequency of the received signal, the second stage of the carrier frequency estimation process is invoked. In this second stage, the carrier sampler device 17 samples the prompt correlator I and Q output signals at 2 millisecond intervals.

During the second stage, these 2 millisecond interval samples are processed by the carrier frequency estimation device 17 to obtain an approximation of the frequency of the carrier of the positioning signals. This is achieved by determining the speed and direction of the phase rotation of the I and Q signals, to determine the difference in frequency between the received carrier and a carrier substitute formed by a combination of the local oscillator signals injected into the downconversion stages contained in the receiver 11 and the frequency translator device 15. The difference frequency is the reciprocal of the time between successive crossings of one of the four axes on which the I and Q signals are conventionally plotted. From this difference frequency and from the known frequency of the carrier substitute, an approximation of the carrier frequency is easily calculated. Alternatively, the carrier frequency estimator device 17 may use an FFT algorithm, with or without a data weighting function such as a Hamming or a raised cosine data weighting function, a Winograd transform or a DFT. Where a DFT algorithm is used, input I and Q samples result in a plurality of outputs each corresponding to the centre frequency of a frequency bin, with the bins being contiguous and equally sized. The size of the output signal for a bin is indicative of the strength of input signals having frequencies corresponding to frequencies falling within that bin. The output having the largest signal is identified, and the corresponding frequency is taken as the estimated carrier frequency. To provide higher resolution carrier frequency estimates, the two or three outputs having the largest signals are identified and interpolated to provide an interpolated carrier frequency estimation of increased accuracy. The carrier frequency estimator device 17 provides carrier frequency estimation signals, which are representative of the estimated carrier frequency, to a control input of the NCO 22 and, during the second stage, also to the data transmission device 14 via an output 26. Data signals identifying the phase of the NCO 22 at the times when the frequency of the NCO 22 is changed are also provided to the data transmission device 14.

The carrier frequency estimation device 17 is controlled to provide updated carrier frequency estimation signals every 100 ms. The carrier frequency estimation signals control the NCO 22 to oscillate at the estimated carrier frequency, which allows the signals provided during the second stage to the code correlator device 16 to be of a suitably low bandwidth such that the difference frequency is within the pass band of the notional filter formed by the 2 ms sampling intervals the sampling of the up/down counters by the carrier frequency estimation device 17.

A vehicle exhibiting acceleration bursts of 20 g (196 m/s$^2$) will experience a change in velocity of 19.6 m/s in 100 ms. The 100 ms update interval of the carrier frequency estimation signals allows the frequency of the carrier to change by 103 Hz between carrier frequency updates at maximum acceleration, assuming that there is no frequency change due to other factors, that there is accurate carrier frequency estimation, and assuming instant control of the frequency of the NCO 22. Alternatively, aliasing of the carrier signal is controlled by a pre-transmission filter provided within the carrier frequency estimator device 17.

Where acceleration averaging more than 20 g over periods of time exceeding 100 ms is possible from the host vehicle, the update frequency of the carrier frequency estimation signals is increased. If it were not increased, the difference between the actual and the estimated frequency would be likely at some time to exceed a maximum tolerable error of 150 Hz. Frequency differences exceeding this amount may cause incorrect position measurements to be obtained. The arrangement of the carrier frequency estimator device 17 and the NCO 22 substantially reduces the carrier tracking stress which is caused by motion of the host vehicle.

The code tracking processor device 19 provides code tracking output signals via an output 28 to the data transmission device 14. These code tracking signals provide pseudo-range estimates for each SV being tracked.

In an alternative embodiment, the carrier frequency estimator device 17 comprises a frequency locked loop. In this embodiment, control of the carrier replica generator is performed automatically.

The frequency locked loop takes complex samples of the correlator outputs from the early and late correlators 23. The samples are eight bit samples taken at 8 millisecond intervals. The carrier signal-to-noise ratio in the resulting 31 Hz bandwidth is in the range +6 dB to +30 dB. Insignificant levels of noise are introduced into the sampled signals. Revised carrier frequency estimation signals are calculated and provided at the sampling frequency. The carrier frequency estimation signals in this case comprises NCO phase information and carrier frequency information, The carrier frequency estimation signals are provided to the NCO 22 and to the data transmission device 14 once in every sample period, that is once every 8 milliseconds.

As with the first embodiment, the carrier sample device 18 provides 25 kHz samples of the correlator output signals of its output 27. However, a carrier loop reconstruction device (FIG. 2, 34) is arranged to track the carrier signals with a loop closure arrangement including a frequency locked loop instead of a phase locked loop.

The advantages of the frequency locked loop embodiment subsist primarily in a reduced amount of data, which results in reduced bandwidth for transmission between the vehicle mountable device 10 and the ground station device 30. The carrier frequency tracking errors obtained using this apparatus are less than those obtained using the open loop carrier estimator embodiment because, with this embodiment, the frequency error is smaller.

The positioning apparatus 10 is further provided with a data input port (not shown). In this way, the apparatus 10 may be loaded with data prior to launch of its host vehicle. This data includes time information to set the clock 9, data indicating the identities of the SVs which are in view and their ephemeris data, to reduce searching time and to allow processing resources to be allocated to other tasks. Alternatively, the positioning apparatus may be aware which SVs are in view through conventional techniques.

Where the positioning apparatus 10 is to acquire satellite signals rapidly, the apparatus 10 is further provided with an initial frequency estimator device (not shown). This feature is of particular benefit where the positioning apparatus is not able to receive positioning signals from satellites prior to launch from a metallic launch tube. The frequency estimator device may utilise either a fast Fourier transform (FFT) processor, or an aliasing and leakage reducing processor.

Each of the carrier frequency estimator device 17, the carrier sampler device 18 and the code tracking processor device 19 receive time data signals from the clock 9, which is a free-running clock having a time which approximates, but does not necessarily equal, GPS time. The signals provided to the data transmission device 14 are all provided with 'time tags'. A time tag is data indicating the time of the clock 9 at the time to which the signals relate. For example, the carrier frequency estimator device 17 provides in the first embodiment carrier frequency estimation signals at 100 ms intervals, the signals each being accompanied by a time tag indicating the time at which they were generated, according to the clock 9.

The data transmission device 14 receives, therefore, three different signals which, although they are all in digital form, are of different natures and are provided at different update intervals. These signals are interleaved to form a composite signal which is modulated onto an RF carrier signal and transmitted from an antenna (not shown). Alternatively, the carrier frequency estimation signals, the carrier sample signals and the code tracking output signals are modulated onto respective RF carriers and transmitted from the antenna as discrete signals. In either case, the carrier NCO phase data signals form part of the carrier frequency estimation signals. The data transmission device 14 may alternatively transmit the signals on an optical carrier signal.

Figure 2:
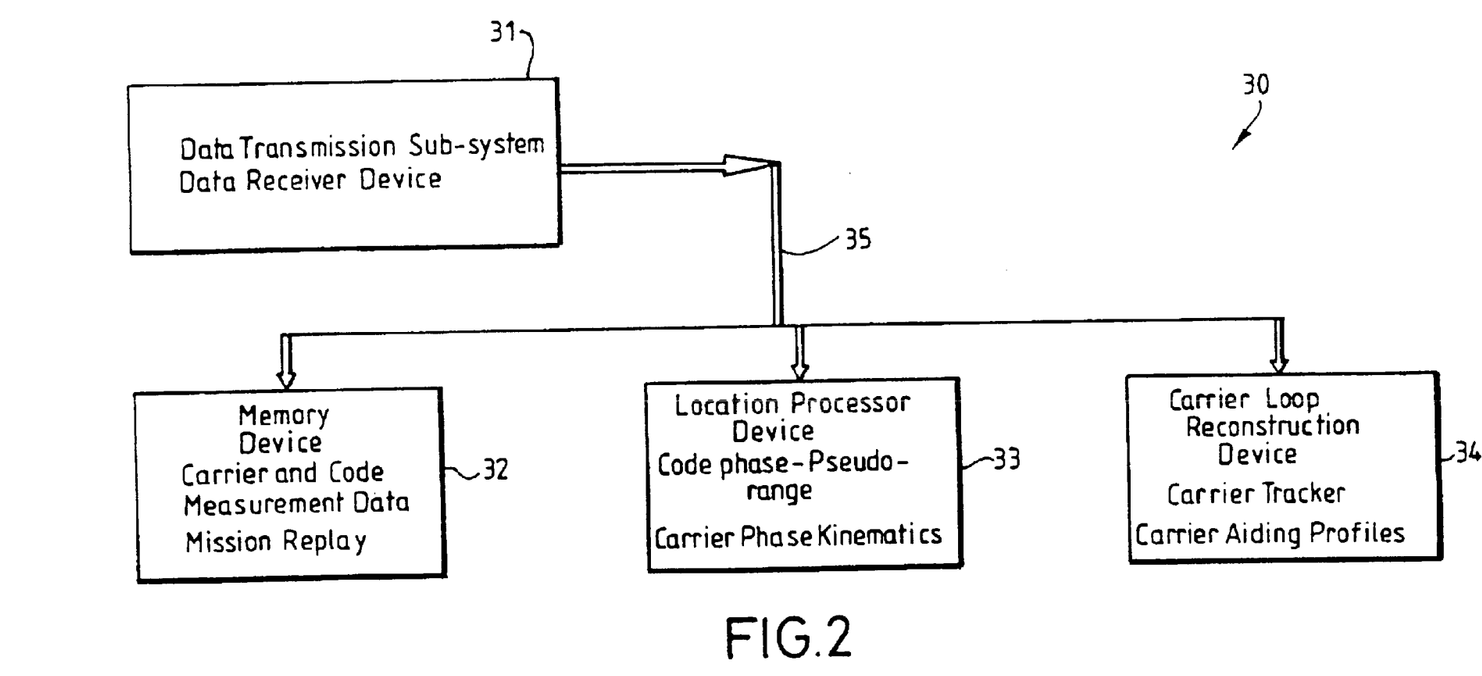
FIG. 2 is a schematic drawing of ground based processing apparatus suitable for use with the positioning apparatus of FIG. 1.

The signals transmitted by the data transmission system 14 of the vehicle mounted positioning apparatus 10 are received at a ground station 30, which is shown in FIG. 2.

Referring to FIG. 2, the ground station 30 comprises a wireless data receiver device 31, which receives the signals transmitted by the positioning apparatus 10, and demodulates the signals to reproduce the carrier frequency estimation signals, the carrier sample signals and the code tracking output signals. The data receiver device 31 provides this data to a memory device 32, to a location processor device 33, and to a carrier loop reconstruction device 34, via an output 35.

The carrier loop reconstruction device 34 includes a processor (not shown) which detects, using carrier aiding profiling and other carrier tracking software, the phase and the frequency of the carrier signals, as experienced by the positioning apparatus 10, to a high degree of accuracy. Data representing the frequency and phase of the carrier signals is provided to the location processor device 33. This carrier signal frequency and phase data is stored in the memory device 32, as is the data provided by the data receiver device 31.

The location processor device 33 includes a pseudo-range measurement device (not shown) which obtains positioning information such as an estimation of the distance between the SV which transmitted the positioning signals and the positioning apparatus 10, by detecting the phase of the modulating code. The location processor 33 includes also a data extraction device (not shown) arranged to demodulate the data present on the positioning signals transmitted by the SVs. The location processor device 33 is arranged to calculate the position of the positioning apparatus at any given moment in time from the data provided to it by the carrier loop reconstruction device 34 and the data receiver device 31. The intervals at which real time position calculations can be made is dependent primarily on the processing power of the location processor device 33.

Position calculations can be made at intervals which exceed the intervals obtainable in real time through the playback of data from the memory device 32 after the flight of the host vehicle. This feature, which can be described as post mission playback, allows specified portions of the vehicle's flight to be analysed in detail.

Of course, the ground station 30 could be located in an aircraft, or on a ship or submarine for instance.

Figure 3:
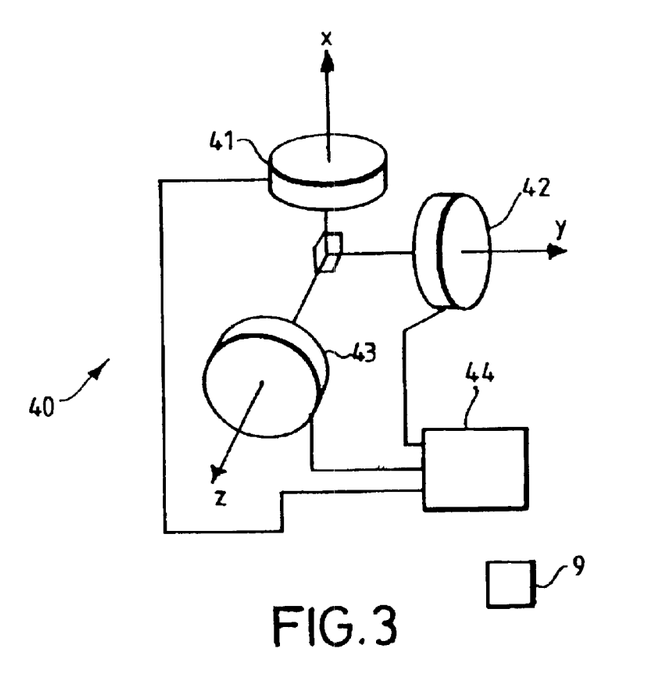
FIG. 3 is a drawing of an accelerometer arrangement used with the positioning apparatus of FIG. 1 in a preferred embodiment.

In a preferred embodiment shown in FIG. 3, the host vehicle is equipped with accelerometers arranged to detect acceleration of the vehicle in each of the x, y and z directions. Preferably, the accelerometers are piezoelectric devices, which are generally inexpensive and small in size, although they could be of any other suitable type.

Referring to FIG. 3, first to third accelerometers 41 to 43 are shown forming part of an accelerometer arrangement 40. The accelerometers 41 to 43 are shown arranged perpendicularly to each other. Each accelerometer is connected to a processor 44, which also receives time data signals from the clock 9. The processor 44 is arranged to detect periodically the acceleration experienced by each of the accelerometers, in a conventional manner, and to generate acceleration data comprising data indicative of the detected acceleration in each of the x, y and z dimensions, and a time tag indicative of the time provided by the clock 9 at the moment of detection of the accelerometer output signals by the processor 44. The processor 44 provides this acceleration data via an output 46 to the data transmission device 14, which transmits the acceleration data along with the other signals in any convenient manner.

In conventional positioning receivers, the use of accelerometers to assist in determining the dynamics of the receiver is not practical since the latency of the acceleration data (which is unavoidable due to measurement delay and the co-ordinate conversion processes which are necessary) results in the data being difficult to use for carrier tracking loops. However latency is not important when position is determined during post-mission playback, i.e. not in real time. In the ground station 30, the acceleration data is stored in the memory device 32 along with the other data. During mission playback, the time tags of the acceleration data are lined up with the time tags of the other data, so that the latency of the acceleration measurements is compensated for.

The acceleration information relating to the host vehicle is subjected to an algorithm, output data from which is used as the control input data for each of the filters whose bandwidth is dependent on the receiver dynamics.

Figure 4:
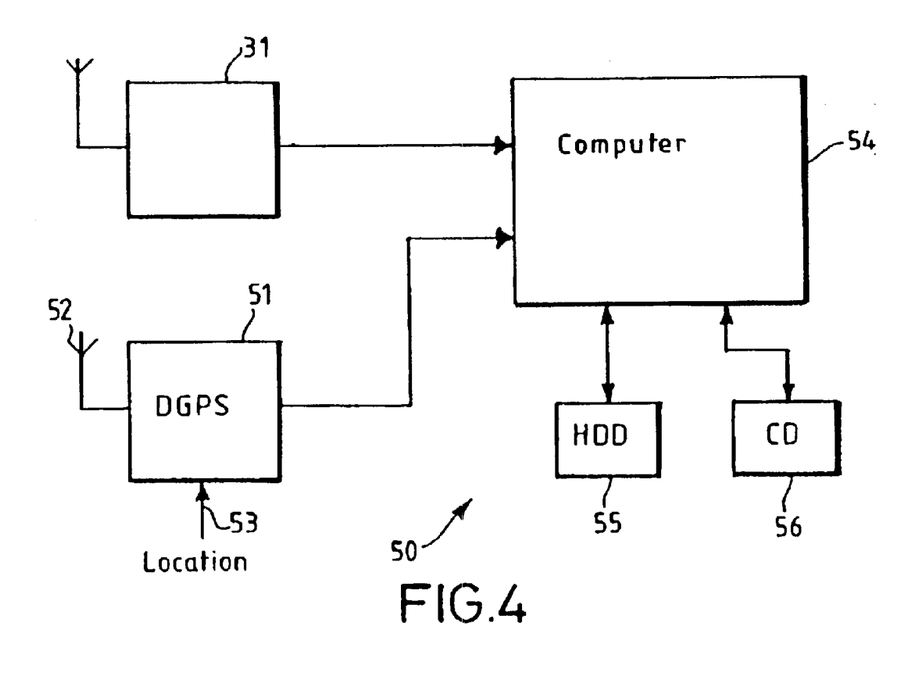
FIG. 4 is a schematic drawing of a modified version of the ground-based processing apparatus of FIG. 2.

A modified version of the FIG. 2 ground station is shown in FIG. 4. Referring to FIG. 4, the ground station 30 is shown with reference numerals retained from FIG. 2 for like elements. Here, the ground station 30 further includes a differential GPS reference receiver 51, which includes an antenna 52 for receiving GPS signals, and a location input 53, by which the ground station is provided with an accurate representation of the location of the reference receiver or, more particularly, its GPS antenna. In a conventional manner, the reference receiver provides reference data indicating which SVs are in view, the pseudo-range errors of each SV, the data stream transmitted by each SV, time tagged to GPS time, and the timing of the edges of the data stream. This reference data is passed to a computer 54, which includes the memory, location processor and carrier Loop reconstruction devices 32, 33 and 34. An external hard disk drive 55 and a CD recorder/rewriter 56 are connected to the computer 54 to provide memory additional to that provided by the memory device 32.

The computer implements software routines on the data received from the data receiver device 31 and from the DGPS reference receiver 51 in real or quasi-real time or post-mission, by reading the data from the hard disk drive 55, the CD recorder 56 or the memory device 32.

The computer 54 strips the data which is modulated onto the signals received from the SVs by receiver 31 by mixing the received signals with the reference data provided by the DGPS reference receiver 51. Since the reference data is time tagged, the computer 54 is able to align the data edges of the reference data exactly with the edges of the data modulated onto the received signals. This is only possible with post mission playback, i.e. it is not possible to perform this with real time GPS signal processing. Of course, certain positioning transmitters, in particular certain pseudo-lites, do not transmit data, so no data removal process is required with signals received from such SVs.

The carrier loop reconstruction device 34 processes the time-tagged carrier frequency estimation signals, the time-tagged carrier sample signals and the time-tagged information concerning the phase of the NCO 22 when its frequency was changed and, using this data, reconstructs the down-converted carrier signal (i.e. the output of the frequency translator device 15). The information used in reconstructing the carrier signal as received by the positioning apparatus 10 is: the phase and frequency of the residual carrier (after downconversion and code removal), the phase and frequency of the NCO 22 and the frequency and phase of the local oscillator(s) used in the downconversion process. The frequency and phase of the downconversion local oscillator (s) are assumed to be constant or nearly constant over relevant periods of time, simplifying calculations. When the carrier loop reconstruction device 34 is operating in real time, i.e. when processing the signals as they are received by the data receiver device 31, the carrier loop reconstruction device is usually able to maintain lock with the carrier signal. However, during periods of exceptionally high acceleration and/or jerk, carrier lock may occasionally be lost, and the system may then be used in a post-mission processing mode.

In post-mission processing, the chance of losing carrier lock can be reduced by altering the characteristics of filters in the carrier loop reconstruction device 34. For instance, when loss of lock in the reconstruction device 34 is detected, the signals from which the carrier is reconstructed are re-played with the filters adjusted to have parameters which are more likely to result in lock being maintained. If lock is again lost, the filters may again be adjusted and the signals again re-played. This adjustment in response to toss of carrier loop lock can be performed iteratively to achieve a maximum improvement in the resistance to losing lock for a given period during which signals were received in the host vehicle. In this way, loss of carrier lock can be delayed or avoided altogether.

According to a preferred aspect of the invention, the carrier loop reconstruction device 34 is arranged to play the signals from which the carrier is reconstructed in reverse time order. This is particularly advantageous when the above-described iterative control of the forward playing carrier reconstruction still results in portions of time when proper carrier reconstruction is not obtained. Reverse time order signal playing allows the periods during which lock is lost to be investigated from a later time to an earlier time, where the acceleration gradient may be less than the acceleration gradient on the forward approach to a period in which lock is lost, resulting in an increased amount of time for which carrier lock is achieved.

It will be appreciated by those skilled in the art how continuous high accuracy position readings are obtained from the reconstructed carrier signals of a number of SVs.

Figure 5:
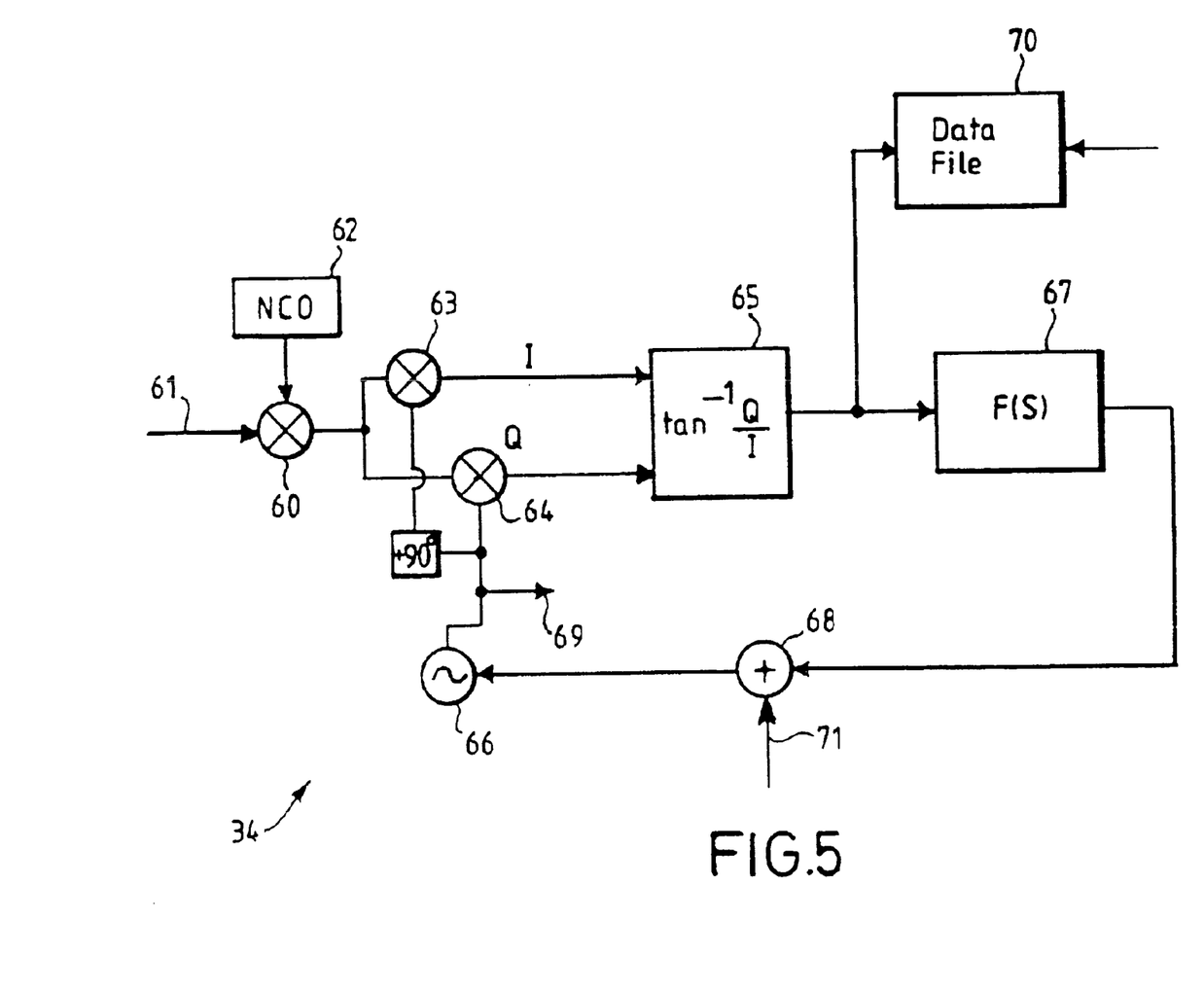
FIG. 5 is a schematic drawing of part of a carrier loop reconstruction device forming part of the apparatus of FIG. 2.

Part of the carrier loop reconstruction device 34 is shown schematically in FIG. 5. Referring to FIG. 5, the carrier loop reconstruction device 34 comprises an input mixer 60, which mixes an input signal received at an input 61 with a local oscillator signal provided by an NCO 62. An output of the input mixer 60 is connected to each of I and Q mixers 63, 64, outputs of which are connected to respective inputs of an arctan operator device 65. The path from an output of the arctan operator device 65 to a carrier oscillator 66, which provides the mixers 63,64 with oscillator signals and provides signals to a carrier output 69, includes a filter 67 and an addition device 68.

The NCO 62 is arranged to oscillate at the same frequency as the NCO 22 of the positioning apparatus 10 (see FIG. 1).

This is achieved simply by providing the NCO 62 with the carrier frequency estimation signals in the same way that they are used to control the NCO 22. The information regarding the phase of the NCO 22 when its frequency is changed is also provided to the NCO 62 in order that it can faithfully emulate the NCO 22. Any difference between the frequency of the signals of the output of the mixer 60 and the frequency of the carrier oscillator 66 results in rotation of the phase vector represented by the I and Q signals provided by the mixers 63 and 64. The degree of rotation is detected by the arctan operator device 65, which provides an output signal directly proportional to the frequency difference. This signal is filtered by the filter 67 and then fed back to control the frequency of the carrier oscillator 66 to more closely resemble the frequency of the received carrier. Signals at the output of the arctan operator device 65 are indicative of the stress of the loop formed by the devices 63–68. These output signals are provided to and recorded in a data file 70 at regular intervals, along with time tags indicative of the time to which the signals relate, as loop stress data. During normal operation, i.e. when iteration is not being used such as in real-time carrier loop reconstruction, a zero-signal is provided to a loop aiding input 71 of the addition device 68.

During post-mission playback, the loop stress data is processed to determine suitable signals which, when added to the output signals of the filter 67 in the addition device 68 by application to the input 71, result in the carrier oscillator 66 more closely resembling the received carrier. Use of this arrangement allows the received carrier to be more accurately reconstructed with successive iterations.

The data file 70 also stores other known information which is able to be used to aid correct carrier loop reconstruction. Such information includes known or estimated initial acceleration profiles, steering information, launch trajectory information and second-stage motor firing acceleration information. For this information to be of most use, information concerning the orientation of the vehicle is also included in the data file 70. This known information, and any acceleration provided by the FIG. 3 accelerometer arrangement, is resolved to the line of sight of each SV during carrier loop reconstruction.

The data file 70 also includes a manual input, by which file manipulation and loop aiding input alteration can be achieved by a human operator.

Use of the data file 70 iteratively to enhance the reconstruction of the carrier signal is used together with or in place of the reverse playback feature described above.

Figure 6:
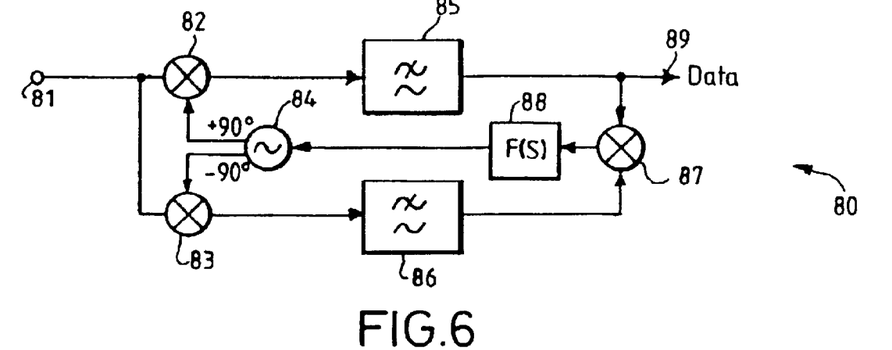
FIG. 6 is a schematic diagram of part of one form of the carrier loop reconstruction device of FIG. 5.

In one embodiment, the carrier loop reconstruction device includes a Costas loop circuit, as is shown in FIG. 6.

Referring to FIG. 6, the Costas loop circuit 80 comprises generally an input terminal 81 which is connected to an input of first and second mixers 82, 83, which are also connected to receive signals from an oscillator 84. A 90° advanced signal is provided to the first mixer 82 and a 90° delayed signal is provided to the second mixer 83 by the oscillator 84. The mixers 82, 83 provide output signals via respective low-pass filters 85, 86 to a third mixer 87. The frequency of oscillation of the oscillator 84 is controlled on the basis of the output signal of the third mixer 87, after modification by a circuit element 88 having a transfer function F(s).

In use, a reconstructed carrier signal is applied to the input terminal. The Costas loop circuit 80 serves to control the oscillator 84 to tend toward generating a signal which is the same frequency as the reconstructed carrier signal, which provides frequency information. This also allows the 50 bits-per-second GPS data to be extracted at a DATA output 89. This arrangement is generally satisfactory, and can be carried out in software with relative ease.

Figure 7:
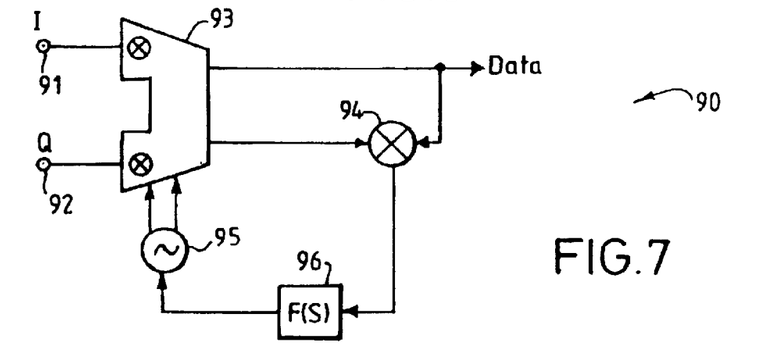
FIGS. 7 and 8 are diagrams of an alternative form Costas loop forming one part of the FIG. 5 carrier loop reconstruction device.

In an alternative embodiment, the Costas loop circuit 80 is replaced with a complex Costas loop, as is shown in FIG. 7.

Referring to FIG. 7, the complex Costas loop 90 comprises generally a complex frequency changer 93 having in-phase and quadrature inputs, connected to respective ones of input terminals 91, 92, and in-phase and quadrature outputs, the outputs being connected to respective inputs of a mixer 94. An output signal provided by the mixer is fed to an oscillator 95 via an element 96 having a transfer function F(s). The frequency of the oscillator 95 is controlled on the basis of the output signal of the mixer 94. A data output is provided at the in-phase one of the outputs of the complex frequency changer 93. The complex frequency changer 93 is a device implemented in software. It frequency translates the in-phase and quadrature signals received at its inputs by an amount equal to the frequency of the oscillator 95, and provides in-phase and quadrature translated signals at its respective outputs. Since the complex frequency changer 93 does not perform any mixing function, no unwanted signals are provided at the outputs, so no filtering is required. This is a significant advantage since analogue filters occupy large areas on integrated circuits, and digital filters require large numbers of gates or, if implemented in software, present a significant processing burden.

Figure 8:
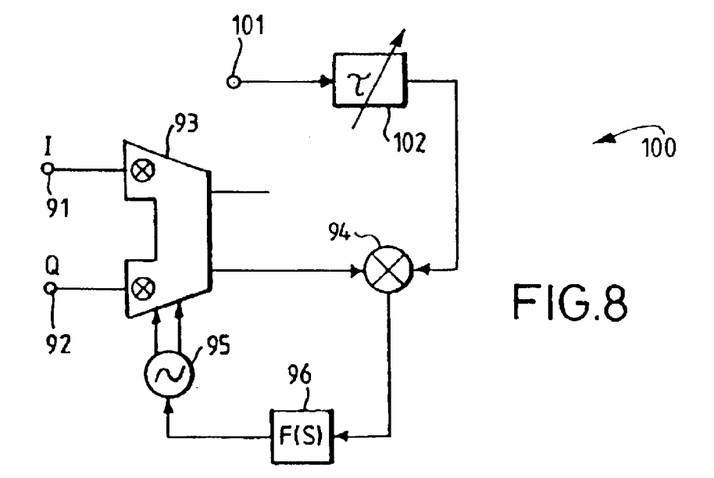

In a further embodiment, a complex Costas loop is arranged to receive GPS data from the DGPS reference receiver 51, as shown in FIG. 8.

Referring to FIG. 8, a Costas loop 100 is shown. Reference numerals are retained from FIG. 7 for like elements. The mixer 94 is connected to receive the quadrature output signal provided by the complex frequency changer 93, and to receive a GPS data signal provided at a DGPS input terminal 101 by the DGPS reference receiver of FIG. 4. A variable delay element 102 is connected between the DGPS input terminal 101 and the mixer 94. The delay element is controlled to provide a delay which results in time alignment of the data received at the input terminal 101 with data provided at the in-phase output of the complex frequency changer 93. The skilled person will appreciate how to achieve time alignment. Since the data signal provided by the DGPS receiver 51 typically is 3 dB less noisy than that provided at the in-phase output of the complex frequency changer 93, a significant improvement in the control of the oscillator 95 is achieved.

In one embodiment, GPS time experienced at the positioning apparatus 10 is calculated to a high degree of accuracy, at the ground station 30. Here, the DGPS receiver subsystem 51 is arranged to provide GPS data along with indications of the GPS time at which each data edge was transmitted from each relevant SV. It will be appreciated by the skilled person how the DGPS receiver subsystem 51 derives this information from the signals transmitted by the satellites. The ground station 30 determines from time tags transmitted with data from the data transmission device 14 the time, according to the GPS clock 9, of the data edges of the signals received at the positioning apparatus 10 for each SV being tracked. The time according to the clock 9 when the data edges were transmitted is then calculated by subtracting from the calculated time a time equal to the propagation delay of signals travelling from the appropriate SV to the positioning apparatus 10. By comparing the results to the information resulting from the DGPS receiver subsystem 51, the difference between GPS time as given by the clock 9 and real GPS time can be calculated. In a simple embodiment, a time difference is calculated in respect of each SV being tracked, the difference then being summed and the result divided by the number of SVs. This results in a time difference which is equal to the mean time difference of the SVs.

In a preferred embodiment, the calculated time difference for the SVs are weighted accordingly to the strength of signals received from them. A higher weighting is given to time differences calculated in respect of SVs from which stronger signals are received at the positioning apparatus 10. An indication of signal strength is given by the modulus of the data signals provided at the in-phase output of the complex frequency changer of FIG. 7, for example.

The arrangements of FIGS. 6 and 7 are of particular use in post-mission playback mode, and the arrangement of FIG. 8 can only be used in this mode.

Figure 9:
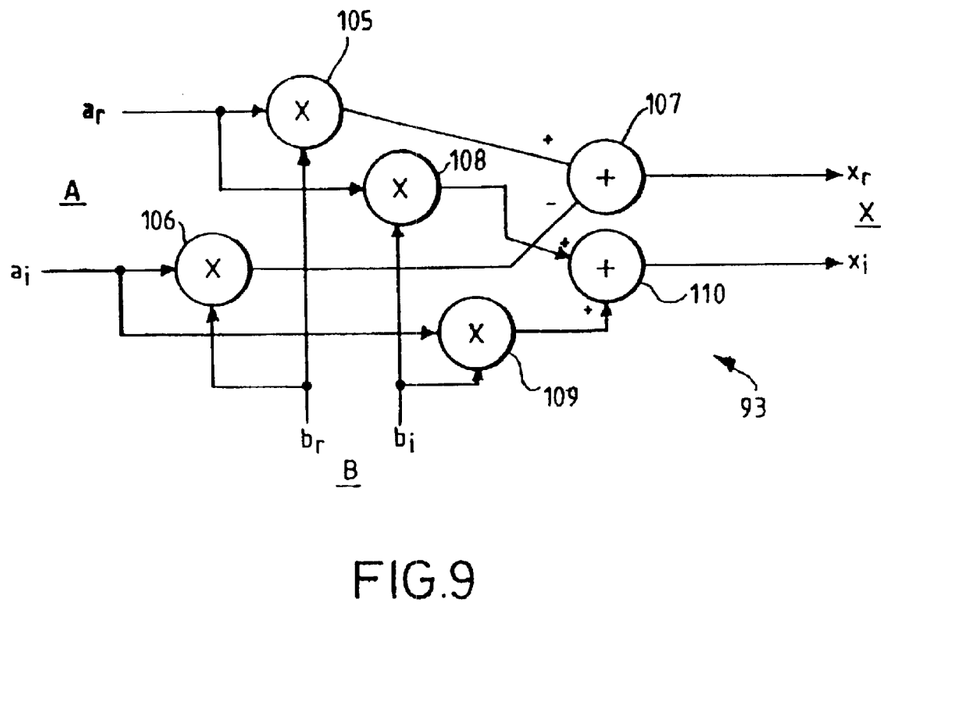
FIG. 9 is a schematic diagram of one form of a complex frequency changer forming part of FIGS. 7 and 8.

One possible form for the complex frequency changer 93 is shown in FIG. 9 It is a two input port, single output port device that has the effect of producing a frequency change if the input signals are sinusoidal. The input ports are configured to accept complex representations of electrical signals. The complex frequency changer 93 performs a matrix multiplication. The A input is represented as a row vector (with real and imaginary parts in the complex signal representation). Input B is a column vector, and is provided by the local oscillator 95. The output port holds the (matrix) product:

$$X = A \cdot B$$

Where $A = |a_r, a_i|$ and $B = |b_r, b_i|^T$

The input A comprises a real component input $a_r$ and an imaginary component input $a_i$. Input B similarly comprises a real component input $b_r$ and an imaginary component $b_i$. Output X is represented by a real component $x_r$ and an imaginary component $x_i$. Values present at inputs $a_r$ and $b_r$ are multiplied together in a first multiplier 105 Values present at inputs $a_i$ and $b_i$ are multiplied together in a second multiplier 106. The value resulting from the second multiplier 106 is subtracted from the value resulting from the first multiplier 105 in a first adder 107, the output of which constitutes the real output $x_r$. Values present at inputs $a_r$ and $b_i$ are multiplied together in a third multiplier 108. Values present at inputs $a_i$ and $b_r$ are multiplied together in a fourth multiplier 109, and the result added in a second adder 110 to the result provided by the third multiplier 108, to form the imaginary output $x_i$.

In the case considered for the frequency changing of the input signal represented by the A signal, the signal at the input B is a sinusoidal waveform with a frequency of $W_O$ The complex representation of A and B allows both negative and positive frequencies to be represented equally well. For example:

$$A = |A| \cdot \{\cos(Wt) + j \cdot \sin(Wt)\}; \ a_r = |A| \cdot \cos(Wt), \ a_i = |A| \cdot \sin(Wt)$$

is a signal with magnitude $|A|$ rotating counter-clockwise in the Argand diagram complex representation—a positive frequency signal rotating at W radians per second. The signal at the input B is similarly defined, but is a sinusoid rotating clockwise in the Argand diagram with a negative frequency of $W_O$ radians per second. The resulting vector, X, is also a sinusoid with a single component at a frequency which is the sum of the frequencies of A and B, $(W-W_O)$ radians per second.

This is unlike a normal demodulation process, which would produce both sum and difference frequencies as well as the negative frequency image. The complex frequency changer 93 may be considered to perform single sideband modulation using the phasing method to eliminate the unwanted (sum) frequency.

$$X = |A| \cdot |B| \cdot \{\cos(W - W_O)t + j \cdot \sin(W - W_O)t\}$$

In normal application, one of the input signals (B) is a sinusoid having a (negative) frequency $(W_O)$ of the amount by which the signals on A are to be reduced in frequency. The A signal may be considered to be represented as a series of sinusoids, the totality of which makes up the complex waveform of A. Since the complex frequency changer 93 satisfies the Theorem of Superposition: $X = [A+C] \cdot B = X = A \cdot B + C \cdot B$, repeated application causes each of the components of A to be reduced in frequency by the same amount. No cross product terms, nor any other unwanted components, are introduced by this process. Consequently, the use of this type of frequency changer for the modulation in a Costas processor is particularly appropriate. The primary benefit is that there is no requirement to filter the signals after the first modulation stage, which allows the frequency changing process to remove completely any frequency difference without any sum frequency component residual. The lack of any filter ensures that the tracking loop filter which is required in a Costas processor is easier to design, since there are no parasitic delay elements in the Costas feedback loop.

What is claimed is:

1. Positioning apparatus for use in a moving vehicle comprising:
   a receiver for receiving coded ranging signals from each of a plurality of remote transmitters including at least one positioning satellite;
   a code correlator device arranged to correlate a locally provided code with the code contained in modulation of the coded ranging signals, and to provide correlator output signals in response thereto;
   a code tracking device responsive to at least some of the correlator output signals to provide code tracking output signals;
   a carrier frequency estimator device, arranged to receive at least some of the correlator output signals, to estimate the carrier frequency of the coded ranging signals, and to provide carrier frequency estimation signals in response thereto, the carrier frequency estimator device being arranged to operate in two modes, the sampling rate of the correlator output signals being higher in an initial mode than in a subsequent mode;
   a carrier sampling device arranged to receive and to sample at least some of the correlator output signals to provide carrier sample signals from which information about the phase of a carrier of the coded ranging signals can be determined; and
   a transmitter arranged to receive the code tracking output signals, the carrier sample signals and the carrier frequency estimation signals, and to transmit signals which are representative of the code tracking output signals, the carrier sample signals and the carrier frequency estimation signals, to allow position information relating to the apparatus to be determined by further processing at a location remote from the vehicle.

2. Apparatus according to claim 1, wherein the carrier frequency estimator device comprises a frequency locked loop.

3. Apparatus according to claim 1, in which the carrier frequency estimator device includes a processor arranged to process the correlator output signals according to a fast Fourier transform algorithm, a Winograd transform algorithm or a discrete Fourier transform algorithm.

4. Apparatus according to claim 3, in which the processor is arranged to process the correlator output signals according to the transform algorithm in a plurality of contiguous frequency windows of finite bandwidth.

5. Apparatus according to claim 1, further comprising a numerically controlled oscillator (NCO) arranged to generate on an output an oscillatory signal having a frequency dependent on a control input signal, the NCO output being connected to a downconvert input of a downconverter forming part of the receiver, the control input signal being derived from the carrier frequency estimation signals, thereby to control the frequency of the NCO output signal on the basis of the carrier frequency estimation signals.

6. Apparatus according to claim 1, further comprising a clock and means to provide the code tracking output signals, the carrier sample signals and the carrier frequency estimation signals with time tags, indicative of the time of the clock at the time to which the respective signals relate, the transmitter being arranged to transmit the time tags.

7. Apparatus according to claim 1, further comprising an accelerometer arrangement arranged to detect any acceleration experienced by the positioning apparatus and to provide acceleration signals in response thereto, the transmitter being arranged also to transmit signals representative of the acceleration signals preferably but not necessarily with time tags.

8. Apparatus according to claim 7, in which the accelerometer arrangement includes three piezoelectric accelerometers arranged generally perpendicularly to each other.

9. Apparatus according to claim 1, further comprising a carrier phase estimator device, arranged to receive at least some of the correlator output signals, to estimate the carrier phase of the coded ranging signals, and to provide carrier phase estimation signals in response thereto.

10. Apparatus according to claim 9, in which the transmitter is arranged to transmit the carrier phase estimation signals preferably but not necessarily with time tags.

11. A positioning system comprising positioning apparatus according to claim 1, and a remote station arranged to receive the signals transmitted from the positioning apparatus and to calculate the position of the positioning apparatus.

12. A method of determining position information relating to a vehicle, the method comprising:

in a receiver associated with the vehicle:
receiving coded ranging signals from each of a plurality of remote transmitters including at least one positioning satellite;
correlating a locally provided code with the code contained in modulation of the coded ranging signals, and providing correlated output signals in response thereto;
tracking at least some of the correlated output signals, and providing code tracking output signals in response thereto;
initially estimating the frequency of the carrier of the coded ranging signals from samples of the correlated output signals, subsequently controlling an oscillator of the receiver to adopt a frequency substantially corresponding to the estimated frequency, subsequently estimating the frequency of the carrier of the coded ranging signals from samples of the correlated output signals having a lower sampling rate that the samples used in the initial estimation step and providing carrier frequency estimation signals in response thereto;
sampling at least some of the correlated output signals to provide carrier sample signals from which information about the phase of the carrier of the coded ranging signals can be determined; and
transmitting signals representative of the code tracking output signals, the carrier sample signals and the carrier frequency estimation signals; and in a remote station, processing the transmitted signals to determine position information relating to the vehicle.

13. A method according to claim 12, in which the carrier frequency estimating step includes the step of processing the correlated output signals according to a fast Fourier transform algorithm, a Winograd transform algorithm or a discrete Fourier transform algorithm.

14. A method according to claim 13, in which the processing step is performed in a plurality of contiguous frequency windows of finite bandwidth.

15. A method according to claim 12 further comprising, in the receiver, using a clock to generate time tags indicative of the time of the clock at the time to which the code tracking output signals, the carrier sample signals and the carrier frequency estimation signals relate, and transmitting the time tags.

16. A method according to claim 12 further comprising estimating the phase of the carrier of the coded ranging signals from the correlated output signals, providing carrier phase estimation signals in response thereto and transmitting the carrier phase estimation signals preferably but not necessarily with time tags.

17. A method according to claim 12 further comprising the step of, in the receiver, controlling the operating frequency of a numerically controlled oscillator on the basis of the carrier frequency estimation signals.

18. A method according to claim 12, further comprising the steps of, in the receiver, generating acceleration signals indicative of acceleration experienced by the receiver, and transmitting the acceleration signals preferably but not necessarily with time tags.

19. Apparatus for calculating the position of a remote vehicle mounted receiver capable of receiving coded ranging signals from each of a plurality of remote transmitters, the apparatus comprising:

a wireless data receiver;
a carrier loop reconstructor device arranged to receive carrier frequency estimation signals and carrier sample signals received at the wireless data receiver, to detect the phase and the frequency of carrier signals received at the remote receiver on the basis thereof, to reconstruct the carrier of the ranging signals as experienced by the vehicle-mounted receiver, and to provide carrier output signals in response thereto;
a pseudo-range measurement device arranged to receive code tracking signals received at the wireless data receiver, to determine positioning information relating to the remote receiver on the basis thereof, and to provide positioning signals in response thereto; and
a location calculator arranged to calculate a location of the remote receiver on the basis of the carrier output signals and the positioning signals.

20. Apparatus according to claim 19, further comprising a numerically controlled oscillator (NCO) arranged to oscillate at the same frequency as an NCO included in the vehicle-mounted receiver.

21. Apparatus according to claim 19, further comprising mixing means for mixing the reconstructed carrier signal with in-phase and quadrature versions of a locally-generated oscillatory signal on respective signal paths, and rotation detecting means for detecting the degree of rotation of the phase vector represented by signals produced by the mixing means.

22. Apparatus according to claim 21, further comprising a data recorder arranged to record signals provided by the rotation detecting means.

23. Apparatus according to claim 19, in which the carrier loop reconstructor device includes a filter and the apparatus is arranged to detect occasions of loss of lock, to alter characteristics of the filter and to subsequently re-present to the carrier loop reconstruction device signals which had resulted in the loss of lock.

24. Apparatus according to claim 23, in which the apparatus is arranged to perform plural iterations, the characteristics of the filter being altered at each iteration.

25. Apparatus according to claim 19, further comprising a data file and means arranged to use data stored in the data file to aid correct carrier loop reconstruction.

26. Apparatus according to claim 19, in which the apparatus is arranged on detection of a loss of lock condition to present to the carrier loop reconstruction device signals in reverse time order.

27. Apparatus according to claim 19, in which the carrier loop reconstruction device includes a Costas loop arrangement arranged to receive at an input thereof a reconstructed carrier signal.

28. Apparatus according to claim 27, in which the Costas loop arrangement includes a complex frequency changer.

29. Apparatus according to claim 28, in which the complex frequency changer has first and second outputs, both connected to respective inputs of a mixer, an output of the mixer being connected to a control input of an oscillator having an output connected to control the amount of frequency changing effected by the complex frequency changer.

30. Apparatus according to claim 29, in which the complex frequency changer has an output connected to an input of a mixer, another input of the mixer being connected to a differential satellite reference receiver, preferably a differential GPS reference receiver, by which the mixer is provided with data modulated onto the received coded ranging signals.

31. Apparatus according to claim 28, in which the complex frequency changer has real and imaginary digital signal inputs and real and imaginary oscillator digital inputs, and is arranged to provide signals at real and imaginary digital outputs having a frequency dependent on the frequencies of the signals received at the inputs.

32. Apparatus according to claim 31, in which the complex frequency changer comprises first to fourth multipliers, the first multiplier having inputs connected respectively to the real digital signal input and to the real oscillator input; the second multiplier having inputs connected respectively to the imaginary signal input and to the imaginary oscillator input; the third multiplier having inputs connected respectively to the real digital signal input and to the imaginary oscillator input; and the fourth multiplier having inputs connected respectively to the imaginary digital signal input and to the real oscillator input; a first adder having inputs connected to respective outputs of the first and fourth multipliers; and a second adder having inputs connected to respective outputs of the second and third multipliers; the first adder being arranged to calculate the difference between values received at its inputs, the second adder being arranged to sum values received at its inputs, outputs of first and second adders being connected to the real and imaginary outputs respectively.

33. Apparatus according to claim 19, further comprising time error calculation means arranged to calculate the error of a remote clock used to generate time tags received along with the carrier frequency estimation signals, the carrier sample signals and the code tracking signals, the error calculation means being arranged to determine the time, according to the remote clock, of an edge of a data signal modulated onto the coded ranging signals, and to compare this time with the time of the same edge of the data signal according to a or the differential satellite reference receiver.

34. Apparatus according to claim 33, in which the time error calculation means is arranged to calculate the error of the remote clock having regard to signals from plural vehicles, and to calculate the mean time error therefrom.

35. Apparatus according to claim 34, in which the time error calculation means is arranged to calculate the error of the remote clock having regard to signals from plural space vehicles, to weight these error values according to the strength of coded ranging signals to which they correspond, and to calculate an average based on the weighted values.

36. A complex Costas loop arrangement, comprising:

a complex frequency changer, having a real and imaginary digital signal inputs and real and imaginary oscillator digital inputs, the complex frequency changer being arranged to provide signals at real and imaginary digital outputs having a frequency dependent on the frequencies of signals received at the inputs; and an oscillator having an input connected, preferably via a device having a transfer function, to the outputs of the frequency changer device;

the oscillator being arranged to provide oscillator signals to the oscillator inputs of the complex frequency changer dependent on signals received at its input.

37. A complex Costas loop arrangement according to claim 36, in which the complex multiplier comprises first to fourth multipliers, the first multiplier having inputs connected respectively to the real digital signal input and to the real oscillator input; the second multiplier having inputs connected respectively to the imaginary signal input and to the imaginary oscillator input; the third multiplier having inputs connected respectively to the real digital signal input and to the imaginary oscillator input; and the fourth multiplier having inputs connected respectively to the imaginary digital signal input and to the real oscillator input; a first adder having inputs connected to respective outputs of the first and third multipliers; and a second adder having inputs connected to respective outputs of the second and fourth multipliers; the first adder being arranged to calculate the difference between values received at its inputs, the second adder being arranged to sum values received at its inputs, the second outputs of the first and second adders being connected to the real and imaginary outputs respectively.

* * * * *